United States Patent
Karlsson

(10) Patent No.: US 9,860,073 B2
(45) Date of Patent: Jan. 2, 2018

(54) MAINTAINING CHARGING STATE DURING FINAL UNIT REDIRECT IN CREDIT-CONTROL SYSTEMS

(75) Inventor: Marcus Karlsson, Karlskrona (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 774 days.

(21) Appl. No.: 13/322,952

(22) PCT Filed: May 30, 2009

(86) PCT No.: PCT/IB2009/052293
§ 371 (c)(1),
(2), (4) Date: Nov. 29, 2011

(87) PCT Pub. No.: WO2010/140023
PCT Pub. Date: Dec. 9, 2010

(65) Prior Publication Data
US 2012/0072319 A1    Mar. 22, 2012

(51) Int. Cl.
*H04L 12/14* (2006.01)
*G06Q 40/00* (2012.01)
(Continued)

(52) U.S. Cl.
CPC .............. *H04L 12/14* (2013.01); *G06Q 10/10* (2013.01); *G06Q 20/4016* (2013.01);
(Continued)

(58) Field of Classification Search
CPC ........ G06Q 40/12; G06Q 40/02; G06Q 40/00; G06Q 10/10; G06Q 20/4016
(Continued)

(56) References Cited

U.S. PATENT DOCUMENTS

2008/0126230 A1* 5/2008 Bellora et al. ............... 705/32
2009/0076952 A1* 3/2009 Cadenas et al. ............. 705/40
2010/0318448 A1* 12/2010 Li et al. ........................ 705/30

FOREIGN PATENT DOCUMENTS

WO    WO 2006/136891 A1    12/2006

OTHER PUBLICATIONS

Meredith, Patricia. Why the frog does not jump out of the boiling water: A multi-level exploration of the limited responses of the Canadian banks to disruptive changes in the Canadian Residential Mortgage industry. York University (Canada), ProQuest Dissertations Publishing, 2009.*

(Continued)

*Primary Examiner* — F. Zeender
*Assistant Examiner* — Fawaad Haider
(74) *Attorney, Agent, or Firm* — Patent Portfolio Builders, PLLC

(57) ABSTRACT

A method is implemented in a credit control server (CCS). The method includes receiving, at the CCS from a credit control client (CCC), a message associated with a multiple services credit control (MSCC) session, where the message includes a request for service units associated with a service account. The method further includes determining, at the CCS, that insufficient service units are available in the service account and notifying the CCC that service units need to be added to the service account. The method also includes maintaining, at the CCS, MSCC session related parameters while the CCC adds service units to the service account.

15 Claims, 10 Drawing Sheets

(51) Int. Cl.
  *G06Q 10/10*    (2012.01)
  *G06Q 20/40*    (2012.01)
  *G06Q 40/02*    (2012.01)
  *H04M 17/00*    (2006.01)
  *H04W 4/24*     (2009.01)

(52) U.S. Cl.
  CPC ............ *G06Q 40/00* (2013.01); *G06Q 40/02* (2013.01); *G06Q 40/12* (2013.12); *H04L 12/146* (2013.01); *H04M 17/00* (2013.01); *H04M 17/20* (2013.01); *H04M 17/201* (2013.01); *H04W 4/24* (2013.01)

(58) Field of Classification Search
  USPC .......................................................... 705/30
  See application file for complete search history.

(56) References Cited

OTHER PUBLICATIONS

International Search Report, PCT Application No. PCT/IB2009/052293, Sep. 8, 2009.
International Preliminary Report on Patentability, PCT Application No. PCT/IB2009/052293, Aug. 19, 2011.
Hakala et al., "Diameter Credit-Control Application", *IETF Standard, Internet Engineering Task Force*, Aug. 1, 2005, 114 pages.

\* cited by examiner

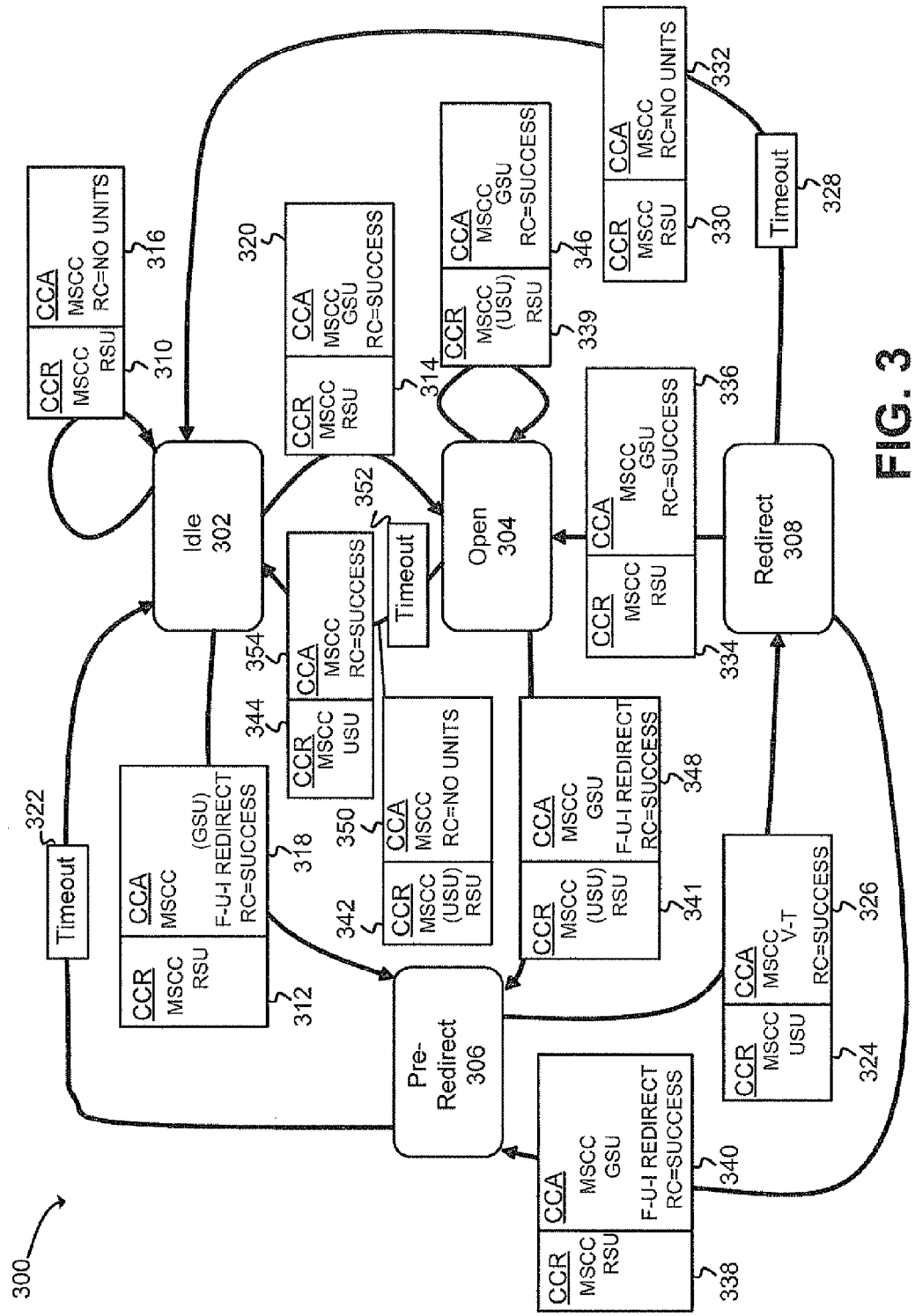

MAINTAINING CHARGING STATE DURING FINAL UNIT REDIRECT IN CREDIT-CONTROL SYSTEMS

CROSS REFERENCE TO RELATED APPLICATION

This application is a 35 U.S.C. §371 national stage application of PCT International Application No. PCT/IB2009/052293, filed on 30 May 2009, the disclosure and content of which is incorporated by reference herein in its entirety. The above-referenced PCT International Application was published in the English language as International Publication No. WO 2010/140023 A1 on 9 Dec. 2010.

TECHNICAL FIELD

Implementations described herein relate generally to credit-control systems, and more particularly, to maintaining a charging state during a final unit redirect for account replenishment in credit-control systems when end user accounts have been depleted of units.

BACKGROUND

Credit control may involve mechanisms that interact in real-time with accounts associated with end users, and controls or monitors the charges related to service usage associated with those end users' accounts. For example, credit control may involve checking whether credit is available for a given account, credit-reservation, deduction of credit from the end user account when service is completed and/or refunding of reserved credit that is not used. Credit control has particular applicability in the provision of network services, such as, for example, provision of cellular airtime in a cellular radio network, provision of multimedia data in a wired or wireless network, etc. Credit control may be implemented by a charging system (e.g., a credit control server) that monitors and controls charges related to service usage of end users and grants and or denies credit authorizations to those end users, thus, enabling network service delivery to the end users.

RFC 4006, entitled "Diameter Credit-Control Application" (DCCA), provides a specification that can be used to implement real-time credit-control for a variety of end user services such as network access, Session Initiation Protocol (SIP) services, messaging services, and download services. RFC 4006 provides a general solution to real-time cost and credit-control in charging systems.

The DCCA specification also specifies a type of subsession called a Multiple Services Credit Control (MSCC) session. When multiple services are used within the same user session and each service or group of services is subject to a different cost, it is necessary to perform credit-control for each service independently. Use of credit-control sub-sessions to achieve independent credit-control can result in increased signaling load and usage of resources in both the credit-control client and the credit-control server. To support multiple services within the same session, the DCCA specifies the MSCC session, which enables independent credit-control of multiple services in a single credit-control (sub-) session. With MSCC sessions, it is possible to request and allocate resources as a credit pool shared between multiple services. With MSCC sessions, it is also possible to request and allocate quotas on a per service basis. Where quotas are allocated to a pool during an MSCC session, the quotas remain independent objects that can be re-authorized independently at any time.

SUMMARY

Exemplary embodiments described herein enable a credit control server to preserve session related parameters, such as counters, etc., during a MSCC session while the end user is replenishing service units in their account. According to exemplary embodiments described herein, a new state machine is defined that permits account replenishment, while preserving MSCC session parameters and maintaining state information during the account replenishment. To preserve session related parameters, exemplary embodiments described herein implement a MSCC state machine that includes new "Pre-Redirect" and "Redirect" states.

According to one aspect, a method implemented in a credit control server (CCS) may include receiving, at the CCS from a credit control client (CCC), a message associated with a multiple services credit control (MSCC) session, where the message includes a request for service units associated with a service account. The method may further include determining, at the CCS, that insufficient service units are available in the service account and notifying the CCC that service units need to be added to the service account. The method may also include maintaining, at the CCS, MSCC session related parameters while the CCC adds service units to the service account.

According to a further aspect, a credit control server (CCS) may include an interface configured to receive a message, from a credit control client (CCC), associated with a multiple services credit control (MSCC) session, where the message requests a grant of service units associated with a service account. The CCS may further include a processor configured to determine, based on the request, that insufficient service units are available in the service account, notify the CCC that service units need to be added to the service account, and maintain, in a memory, MSCC session related parameters during a period of time during which the CCC adds service units to the service account.

According to yet another aspect, a computer-readable medium containing instructions executable by at least one processor may include one or more instructions for receiving, from a client, a message associated with a multiple services credit control (MSCC) session, where the message includes a request for service units associated with a service account. The computer-readable medium may further include one or more instructions for notifying the client, based on receipt of the request for service units, when insufficient service units are available in the service account, where the notification includes a final unit indication (F-U-I) and a network address at which the client can add service units to the service account; and one or more instructions for continuing the MSCC session, without losing session parameters and state information associated with the MSCC session, once the client adds service units to the service account.

BRIEF DESCRIPTION OF THE DRAWINGS

FIG. 3 illustrates a state diagram associated with an MSCC session according to exemplary embodiments;

DETAILED DESCRIPTION

The following detailed description of the invention refers to the accompanying drawings. The same reference numbers in different drawings may identify the same or similar elements. Also, the following detailed description does not limit the invention.

When engaged in a MSCC session, an end user's account may become depleted of units in the midst of the MSCC session. When the end-user's account has been depleted, the DCCA specification of RFC 4006 supports a method to instruct the credit control server to redirect the end-user to an alternative service. This redirection may be performed using a Final-Unit-Indication (F-U-I) Redirect that may connect the end-user to a "top-up" service so that the end-user may replenish their account via a graceful service termination process. The graceful service terminal process typically includes terminating the MSCC session when the redirect occurs.

During a MSCC session, the MSCC session enters an "Open" state when a MSCC that includes a "request for service units" (RSU) is received and leaves it when a MSCC with used units (used service units (USU)), but without an RSU, is received. A problem with combining graceful service termination and MSCC is that the DCCA server (i.e., credit control server) closes the MSCC session when the end-user has been connected to the "top-up" service (i.e., F-U-I Redirect is active). Closing the MSCC session causes the DCCA server to "flush" session related parameters. When the F-U-I Redirect is active, the MSCC session may enter an "idle" state during which the session parameters are discarded. Thus, during an MSCC session where an end-user needs to replenish their account, the credit control server typically closes the MSCC session resulting in session related parameters not being preserved (i.e., "flushed").

Exemplary embodiments described herein enable the credit control server to preserve session related parameters, such as counters, etc., while the F-U-I Redirect is ongoing (i.e., while the end user is replenishing service units in their account). According to exemplary embodiments described herein, a new state machine is defined that permits F-U-I Redirect, while preserving MSCC session parameters and maintaining state information, during the Redirect. As described in further detail below, the new MSCC state machine includes two new states "Pre-Redirect" and "Redirect," in addition to "Idle" and "Open" states.

Figure 1A:
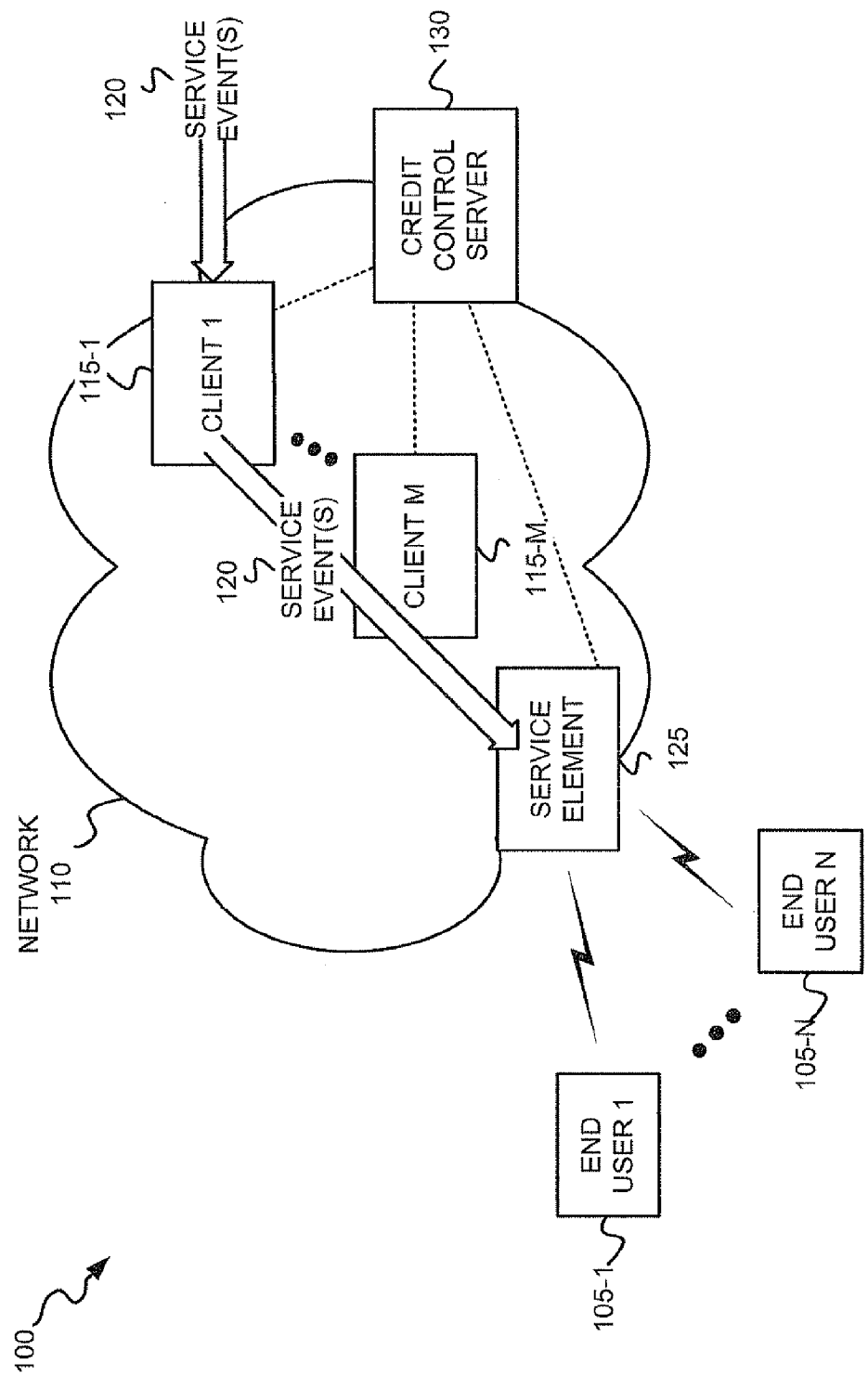
FIG. 1A illustrates an exemplary system in which a network service(s) may be provided to one or more end users.

FIG. 1A illustrates an exemplary system 100 in which a network service(s) may be provided to one or more end users. As shown in FIG. 1A, system 100 may include end user devices 105-1 through 105-N connected to a network 110. Network 110 may include clients 115-1 through 115-M that act as intermediate devices for forwarding a service event 120 associated with a network service to a service element 125, which provides the network service to end users 105-1 through 105-N. Service event 120 may involve a MSCC session, as defined in IETF RFC 4006.

Each of clients 115-1 through 115-M may include a credit-control client (e.g., a Diameter Credit control client as specified in IETF RFC 4006) that interacts with a credit-control server, such as, for example, credit control server 130. Each of clients 115-1 through 115-M (alternatively called "credit control clients" herein) may monitor usage of a service grant according to instructions provided by credit control server 130. Service element 125 may include a network element or device that provides a network service to end users via end user devices 105-1 through 105-N. In some implementations, service element 125 and a client (e.g., client 115-M) may be combined into a single network element or device, and service element 125/client 115-M may act as a credit-control client. Examples of service element 125 may include a network access server (NAS), a Session Initiation Protocol (SIP) proxy server, and an Application server, such as, for example, a messaging server, a content server, and/or a gaming server.

Credit control server 130 may include a server entity that performs credit-control associated with one or more network services. Credit control server 130 may perform the credit-control before a service event is delivered to one or more of end users 105-1 through 105-N.

As shown in FIG. 1A, a service event 120, intended for one or more of end users 105-1 through 105-N, may be received by client 115-1. Client 115-1 may forward service event 120 to client 115-M which, in turn, may forward it to service element 125 for provision of the associated service to one or more of end users 105-1 through 105-N. In conjunction with the forwarding of service event 120, each of clients 115-1 through 115-M may send a charging request (not shown) to credit control server 130 requesting authorization/denial of delivery of service event 120 to a respective one of end users 105-1 through 105-N. In response to each charging request, credit control server 130 may send an authorization message that grants delivery of the service (e.g., delivery of a granted quota) to the respective end user 105 or a denial message that denies delivery of the service to the respective end user 105 based on performance of credit-control mechanisms.

Each of end user devices 105-1 through 105-N may include a cellular radiotelephone, a personal digital assistant (PDA), a Personal Communications Systems (PCS) terminal, a laptop computer, a desktop computer, a palmtop computer, or any other type of device or appliance that includes a communication transceiver that permits the device to communicate with other devices. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. A PCS or a PDA may include a SIP User Agent (SIP UA) which may be used for SIP signaling in the Internet Protocol (IP) Multimedia Subsystem (IMS) domain.

Network 110 may include one or more networks of any type, including a local area network (LAN); a wide area network (WAN); a metropolitan area network (MAN); a telephone network, such as a Public Switched Telephone Network PSTN or a Public Land Mobile Network PLMN; a satellite network; an intranet, the Internet; or a combination of networks. The PLMN(s) may further include a packet-switched sub-network, such as, for example, General Packet Radio Service (GPRS), Cellular Digital Packet Data (CDPD), a Mobile Internet Protocol (IP) network, or an IMS network.

It will be appreciated that the number of components illustrated in FIG. 1A is exemplary. Other configurations with more, fewer, or a different arrangement of components may be implemented. Moreover, in some embodiments, one or more components in FIG. 1A may perform one or more of the processes and/or operations described as being performed by one or more other components in FIG. 1A.

Figure 1B:
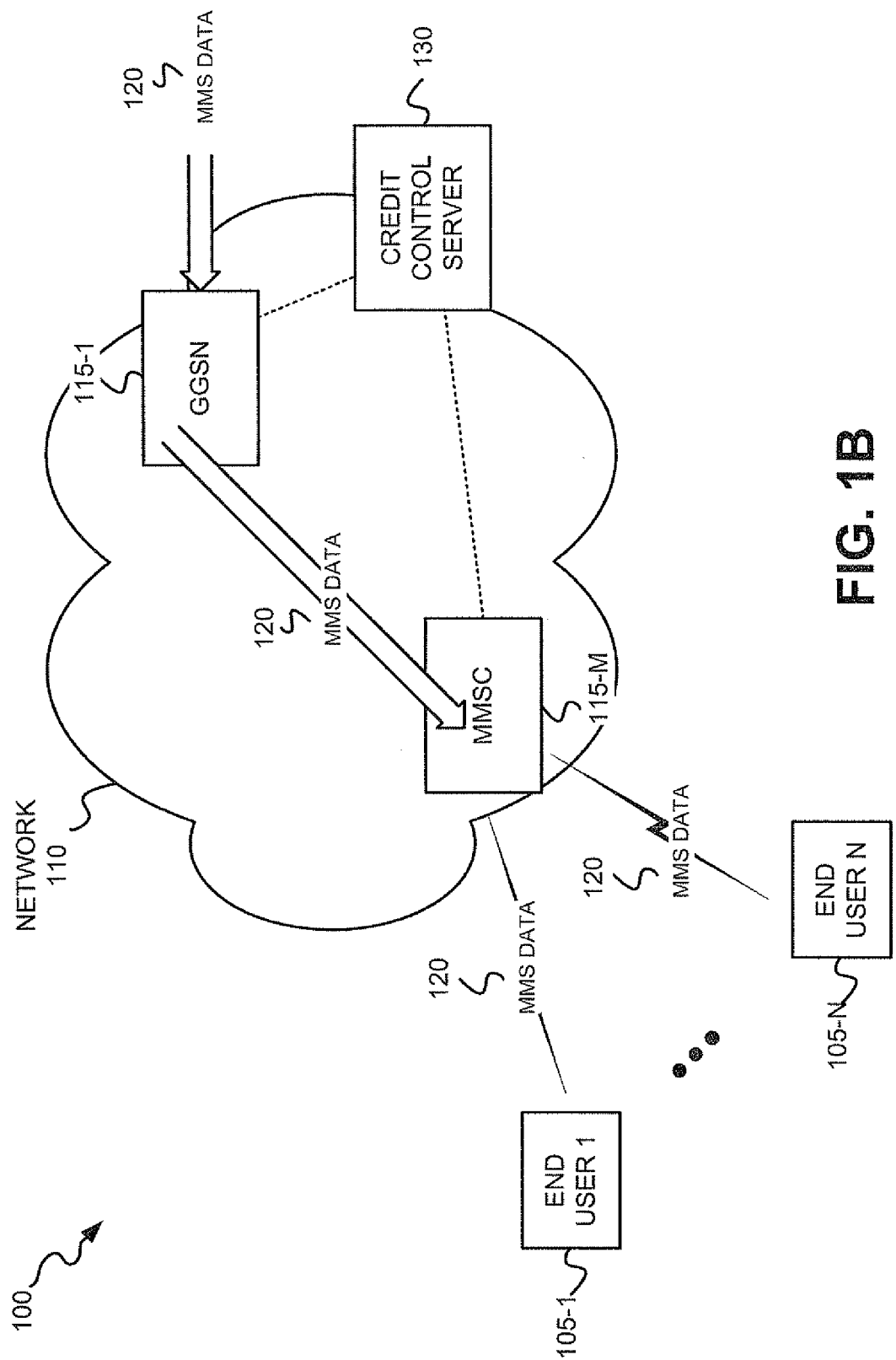
FIG. 1B illustrates an exemplary implementation of the system of FIG. 1A in which one client includes a Gateway General Packet Radio Service Support Node (GGSN) and another client includes a Multimedia Messaging Service Center (MMSC)

FIG. 1B illustrates system 100 in an exemplary implementation in which client 115-1 includes a Gateway General Packet Radio Service (GPRS) Support Node (GGSN) and client 115-M includes a MMSC. In the exemplary implementation of FIG. 1B, MMSC 115-M combines the functionality of client 115-M and service element 125 of FIG. 1A, and the service event (i.e., service event 120 of FIG. 1A) includes Multi-Media Service (MMS) data that is being delivered to one or more of end users 105-1 through 105-N. Upon receipt of MMS data 120, GGSN 115-1 may forward the data to MMSC 115-M for possible delivery to one or more of end users 105-1 through 105-N via end user devices 105-1 through 105-N. GGSN 115-1 additionally may send a charging request (not shown) to credit control server 130 requesting authorization/denial of delivery of MMS data 120 to one or more of end users 105-1 through 105-N. MMSC 115-M may receive MMS data 120 from GGSN 115-1 and may also send a charging request (not shown) to credit control server 130. Upon receipt of the authorization/denial from credit control server 130, MMSC 115-M may either deliver, or not deliver, MMS data 120 to one or more of end users 105-1 through 105-N.

Figure 2A:
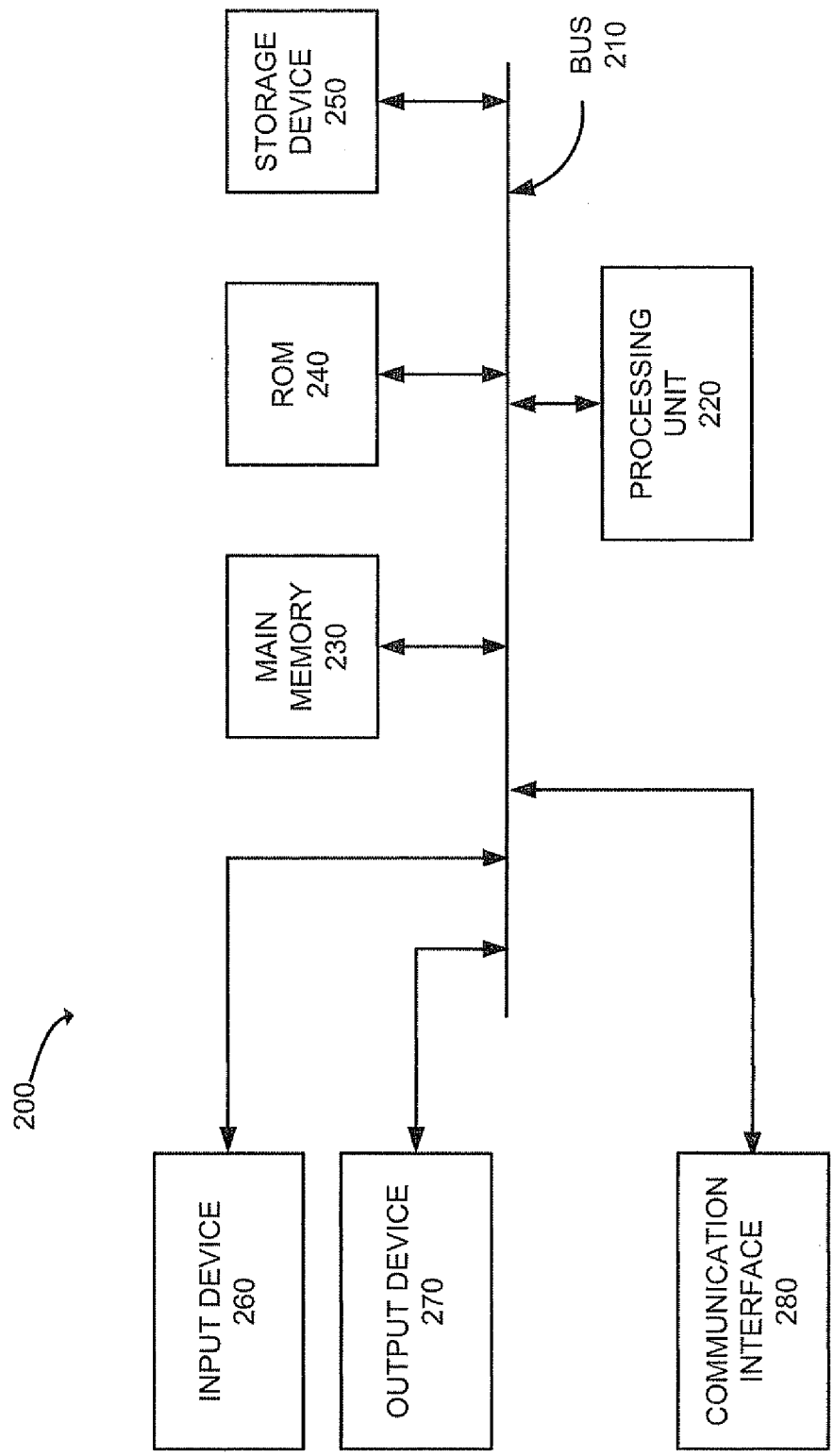
FIG. 2A illustrates exemplary components of a device that may correspond to a credit control client, a service element or a credit control server of FIG. 1A.

FIG. 2A is an exemplary diagram of a device 200, which may correspond to one or more of clients 115-1 through 115-M, service element 125, and/or credit control server 130, according to an exemplary implementation. As illustrated, device 200 may include a bus 210, a processing unit 220, a main memory 230, a Read Only Memory (ROM) 240, a storage device 250, an input device 260, an output device 270, and a communication interface 280. Bus 210 may include a path that permits communication among the elements of the client/server entity.

Processing unit 220 may include a conventional processor, microprocessor, or processing logic that may interpret and execute instructions. Main memory 230 may include a random access memory (RAM) or another type of dynamic storage device that may store information and instructions for execution by processing unit 220. ROM 240 may include a conventional ROM device or another type of static storage device that may store static information and instructions for use by processing unit 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 110.

Device 200 may perform certain operations or processes described herein. Device 200 may perform these operations in response to processing unit 220 executing software instructions contained in a computer-readable medium, such as main memory 230, ROM 240, and/or storage device 250. A computer-readable medium may be defined as a physical or a logical memory device. For example, a logical memory device may include memory space within a single physical memory device or distributed across multiple physical memory devices. Each of main memory 230, ROM 240 and storage device 250 may include computer-readable media. The magnetic and/or optical recording media (e.g., readable CDs or DVDs) of storage device 250 may also include computer-readable media.

The software instructions may be read into main memory 230 from another computer-readable medium, such as storage device 250, or from another device via communication interface 280. The software instructions contained in main memory 230 may cause processing unit 220 to perform operations or processes described herein. Alternatively, hardwired circuitry may be used in place of or in combination with software instructions to implement processes and/or operations described herein. Thus, implementations described herein are not limited to any specific combination of hardware and software.

Figure 2B:
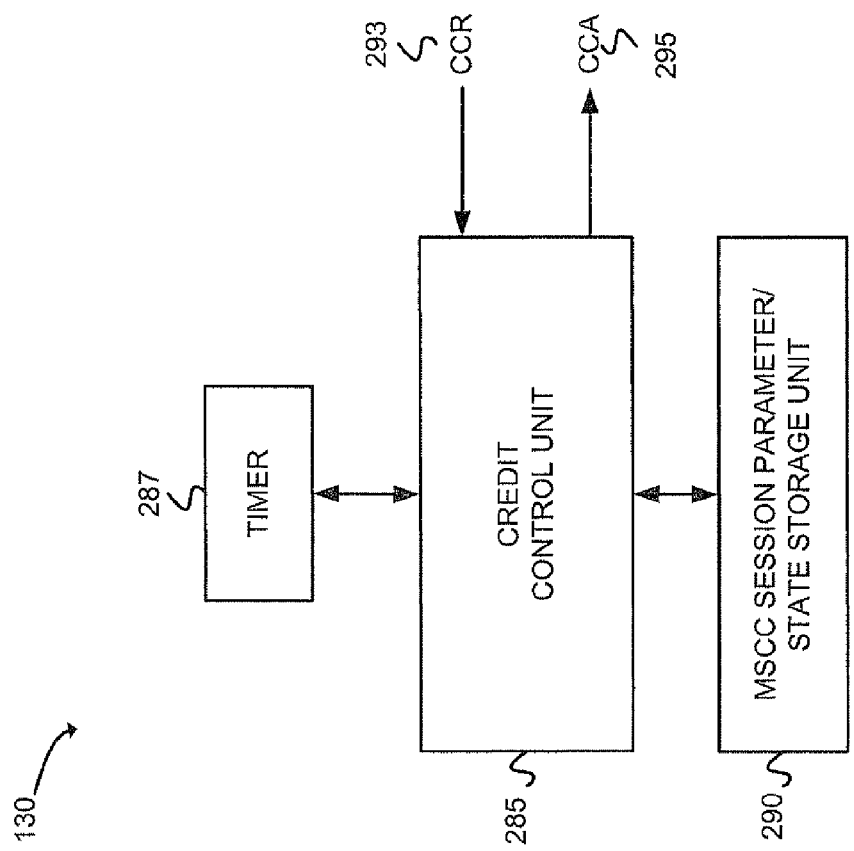
FIG. 2B illustrates exemplary functional components associated with the operation of the credit control server of FIG. 1A.

FIG. 2B is a diagram illustrating functional components associated with the operation of credit control server 130. The functional components depicted in FIG. 2B may be implemented by processing unit 220 of credit control server 130 and may include a credit control unit 285, a timer 287 and a MSCC session parameter/state storage unit 290. Credit control unit 285 may perform credit control functions, such as, for example, receiving incoming Credit Control Requests (CCRs) 293 and formulating outgoing Credit Control Answers (CCAs) 295. Credit control unit 285 may grant or deny service units requested by credit control clients based on the availability of service units in end user's accounts. Timer 287 may track a current time and may compare various validity time values (described further herein) to determine whether the validity time values have timed out (i.e., expired). MSCC session parameter/state storage unit 290 may maintain and store MSCC session related parameters (counters, etc.).

FIG. 3 illustrates a state diagram 300 associated with an MSCC session according to an exemplary embodiment. State diagram 300 of FIG. 3 depicts a state machine representation of a current state of an MSCC session. As shown in FIG. 3, state diagram 300 may include multiple states, including an Idle state 302, an Open state 304, a Pre-Redirect state 306 and a Redirect state 308. An MSCC session typically begins in Idle state 302 prior to a credit control request (CCR), that includes a request for units, being received from a credit control client 115.

As shown in FIG. 3, when the MSCC session is in Idle state 302, a CCR 310, 312 or 314 may be received from a credit control client 115 at credit control server 130. CCR 310 may request a certain number of units (e.g., Requested Service Units (RSU as defined in IEFT RFC 4006) for an identified MSCC session. Credit control server 130 may determine whether an account associated with the request for units is depleted of units and, if so, may deny a grant of units to credit control client 115 by returning a Credit Control Answer 316 that includes a result code (RC) that indicates that no units are available. As shown in FIG. 3, upon sending CCA 316, the MSCC state may return to idle state 302. Alternatively, if credit control server 130 determines that the account is depleted of units, credit control server 130 may return a CCA 318 that includes a F-U-I Redirect so that, upon receipt by credit control client 115, credit control client 115 may "top-up" (i.e., refill) the end user's service units. In this alternative, as shown in FIG. 3, Idle state 302 may transition to Pre-Redirect state 306.

As also shown in FIG. 3, in response to receipt of CCR 312, which includes a request for units (RSU), credit control server 130 may determine that a sufficient number of service units are not available, and may grant any available service units via a CCA 318 that includes a Granted Service Unit (GSU) (as defined in IETF RFC 4006) and which further includes a F-U-I Redirect so that, upon receipt by credit control client 115 and after the granted service units have been consumed, credit control client 115 may "top-up" the end user's service units. Idle state 302, as shown in FIG. 3, may transition to Pre-Redirect state 306.

In response to CCR 314, which includes a request for service units (RSU), credit control server 130 may determine that a sufficient number of service units is available (e.g., the requested number of units is available), and may grant the requested service units via a CCA 320 that includes a GSU. As shown in FIG. 3, Idle state 302 may transition to Open state 304.

When the MSCC session is in Pre-redirect state 306, if a validity time associated with previously granted units times out 322 (i.e., expires), then Pre-Redirect state 306 may return to Idle state 302. If the validity time has not timed out, credit control server 130 may receive a CCR 324 from credit control client 115 that includes a Used Service Unit (USU) indicator that reports the depletion of previously granted service units. Credit control server 130 may return a Redirect validity time (Redirect V-T) value back to credit control client 115 via CCA 326, and Pre-Redirect state 306 may transition to Redirect state 308.

When the MSCC session is in Redirect state 308, if the redirect validity time value times out 328 (i.e., expires), Redirect state 308 may transition to Idle state 302. Additionally, when the MSCC session is in the Redirect state 308, if a CCR 330 is received by credit control server 130 that includes a request (e.g., a RSU) for a specific number of units, and no units are available, credit control server 130 may send a CCA 332 that includes an indication that no units are available (e.g., result code=no units), to credit control client 115, and Redirect state 308 may transition to Idle state 302.

As further shown in FIG. 3, when the MSCC session is in Redirect state 308, if a CCR 334 is received by credit control server 130 that includes a request (e.g., a RSU) for a specific number of units, and sufficient units are available, then credit control server 130 may send a CCA 336 that includes a GSU granting the requested number of units, to credit control client 115, and Redirect state 308 may transition to Open state 304.

When the MSCC session is in Redirect state 308, if a CCR 338 is received by credit control server 130 that includes a request (e.g., a RSU) for a specific number of units, and insufficient units are available (i.e., some units, but not all of the requested units), then credit control server 130 may send a CCA 340 that includes a GSU to grant the available units, and which may further include a F-U-I Redirect so that, upon receipt by credit control client 115, credit control client 115 may "top-up" the end user's service units. In this case, Redirect state 308 may transition to Pre-Redirect state 306.

When the MSCC session is in Open state 304, credit control server 130 may receive a request (RSU) for a specific number of units via CCR 339, CCR 341, or CCR 342. CCR 339 may additionally include a report of used service units (USU). Upon receipt of CCR 339, and based on a determination that the requested number of service units are available for end user 105, credit control server 130 may grant the requested number of service units (e.g., GSU) via a CCA 346 to credit control client 115. Upon sending of CCA 346, the MSCC session may return to Open state 304.

As shown in FIG. 3, CCR 341 may request a specific number of units (RSU) and, upon receipt of CCR 341, credit control server 130, based on a determination that a sufficient number of service units are not available (e.g., units are available, but less than the requested number), then credit control server 130 may grant the available units (e.g., GSU) and may return a F-U-I Redirect via a CCA 348 to credit control client 115. CCR 341 may additionally include a USU (as defined in IETF RFC 4006) to report the number of previously granted units that have been used. Upon receipt of CCA 348 with the F-U-I Redirect, credit control client 115 may "top-up" (i.e., refill) the end user's service units. In this case, Open state 304 may transition to Pre-Redirect state 306.

CCR 342 may request a specific number of units (e.g., GSU) and, upon receipt of CCR 342, credit control server 130, based on a determination that no units are available, may deny the grant of the requested units via CCA 350 (e.g., with result code=no units). CCR 342 may additionally include a report of used service units (USU). Open state 304 may then transition to Idle state 302. When the MSCC session is in Open state 304, if a validity time associated with previously granted units times out 352 (i.e., expires), Open state 304 may transition to Idle state 302.

CCR 344 may report a number of used units (USU), without requesting additional units. Upon receipt of CCR 344, credit control server 130 may acknowledge the reported units via CCA 354. The MSCC session may then transition from Open state 304 to Idle state 302.

Figure 4:
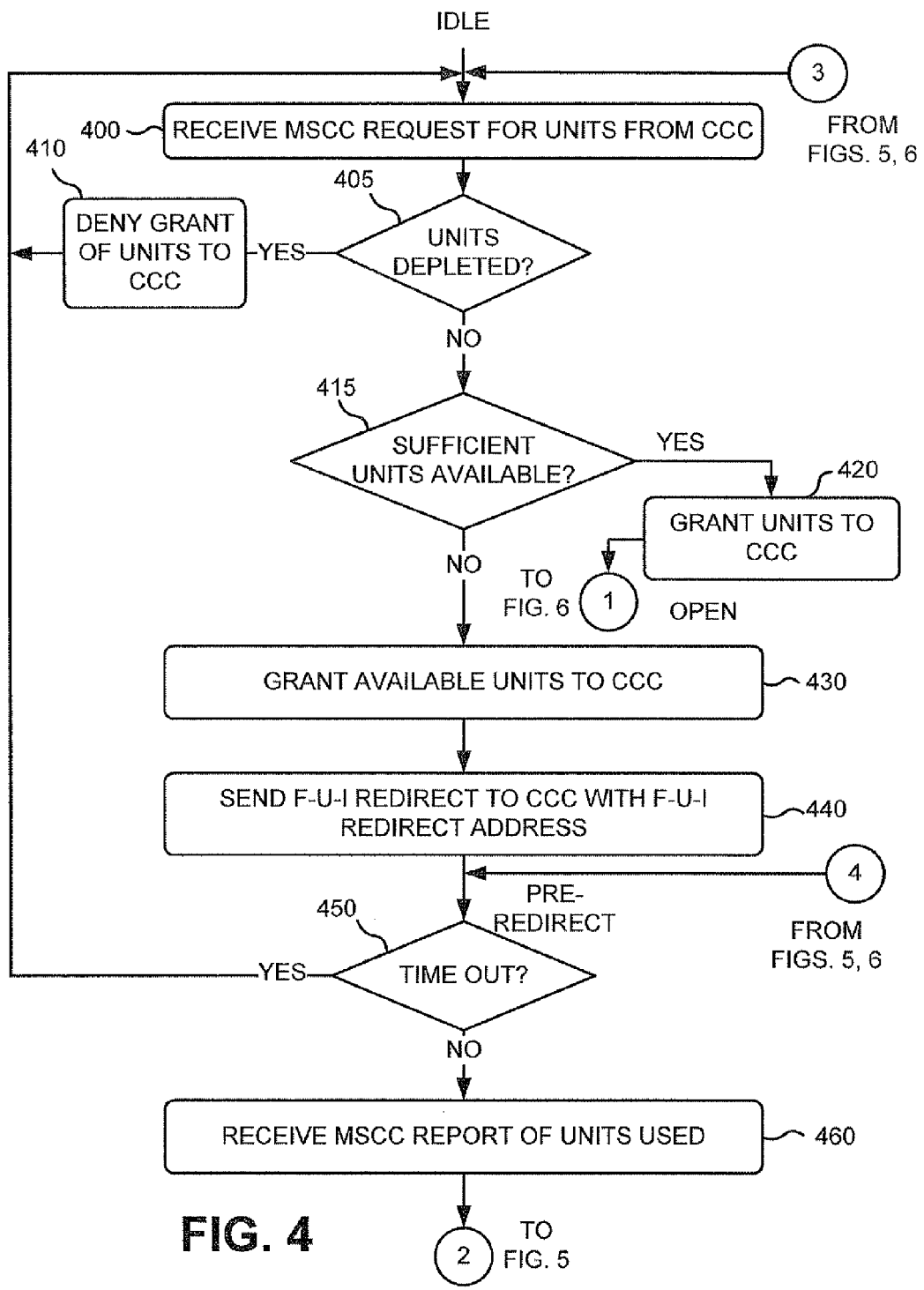
FIGS. 4-6 are flowcharts of an exemplary process for initiating graceful service termination during a MSCC session while maintaining MSCC session related parameters.
Figure 5:
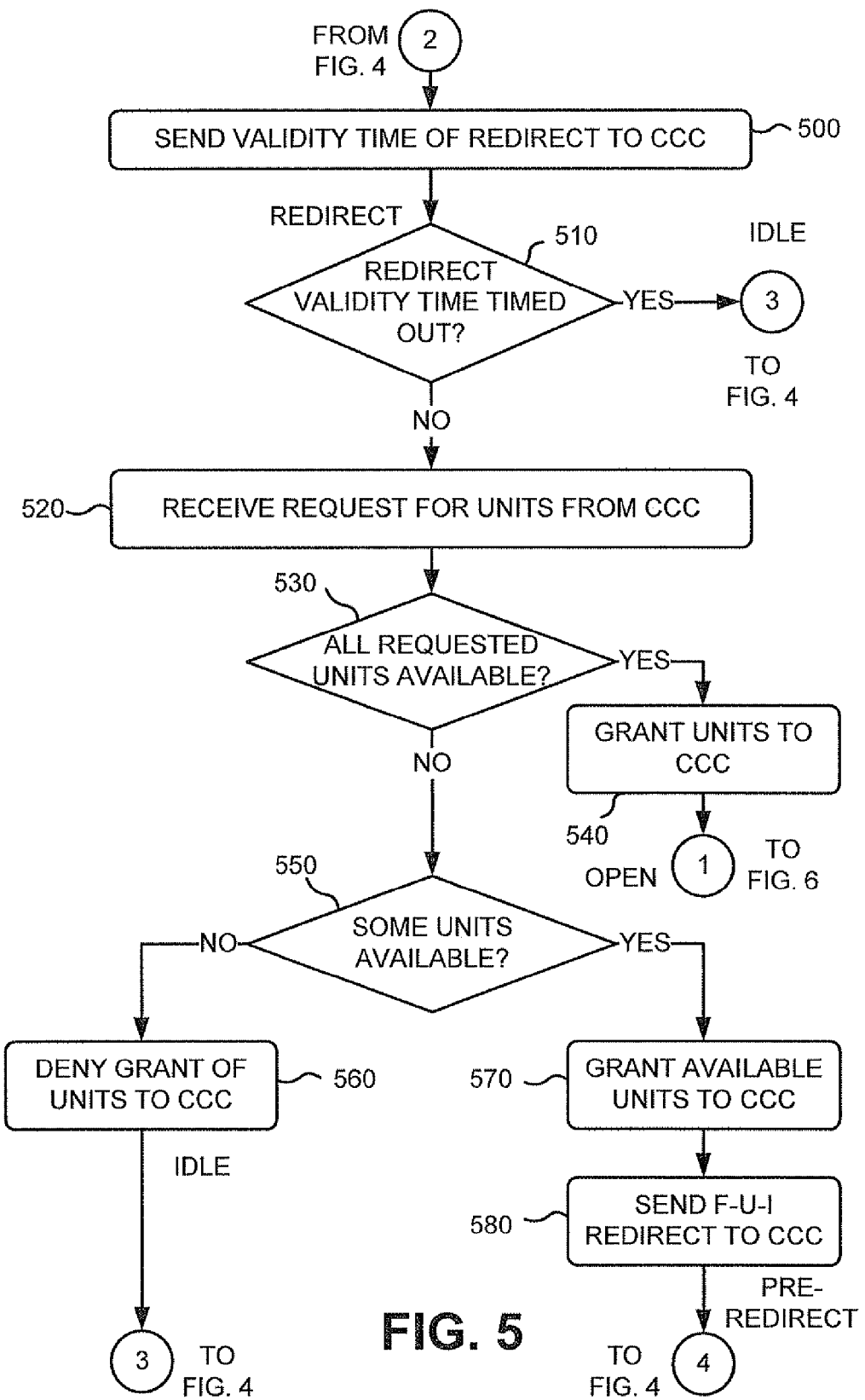
Figure 6:
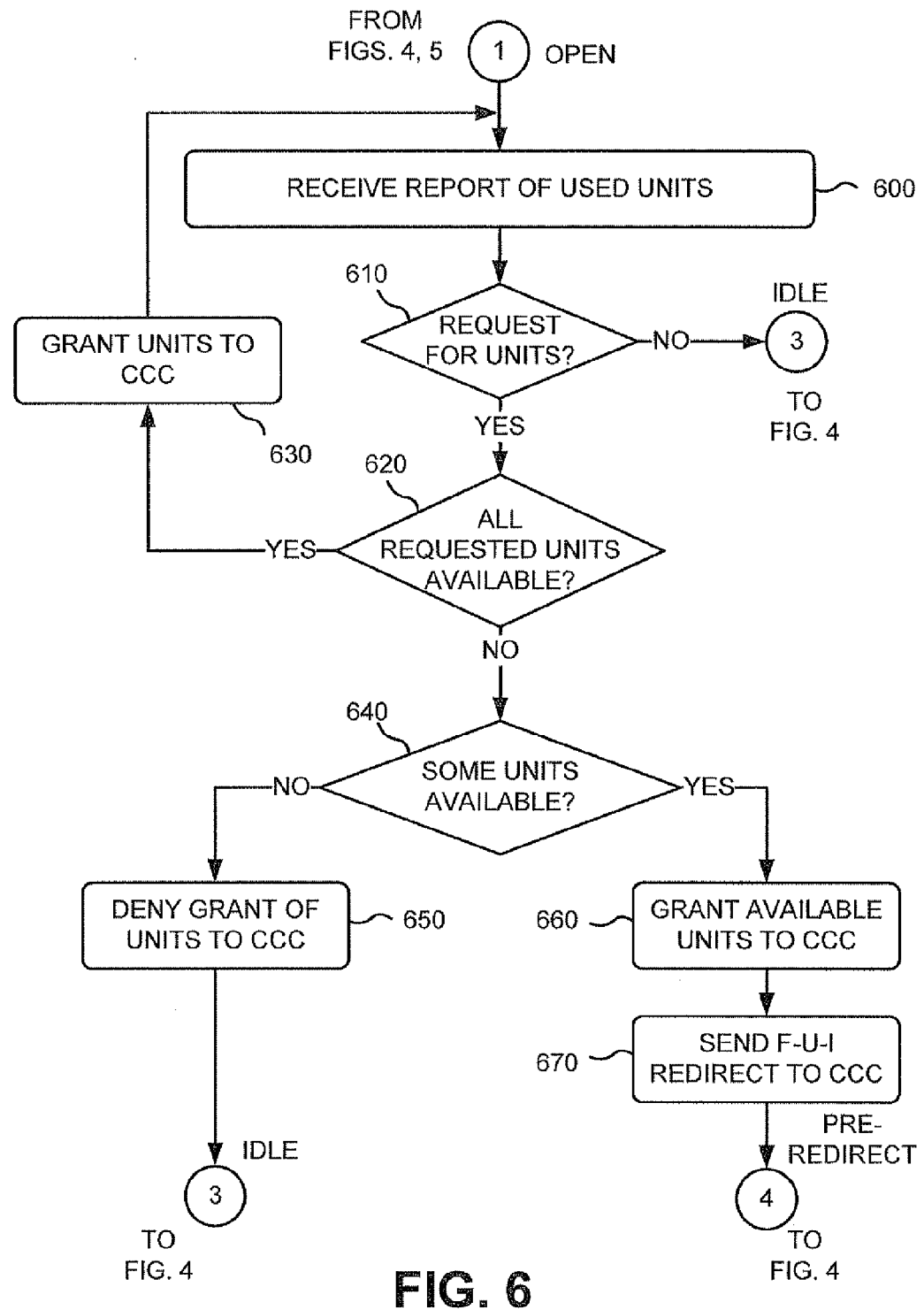

FIGS. 4-6 are flowcharts of an exemplary process for initiating graceful service termination during a MSCC session while maintaining MSCC session related parameters. The exemplary process of FIGS. 4-6 may be implemented, for example, by credit control server 130.

The exemplary process may begin with credit control server 130 receiving an MSCC request for units from credit control client 115 (block 400). The exemplary process may begin with the MSCC session in Idle state 302 (FIG. 3). Referring to FIG. 3, credit control server 130 may receive a CCR 310, 312 or 314 that includes a request for service units (RSU). It may be determined whether the units of the account associated with the request for units have been depleted (block 405). If so (block 405—YES), then credit control server 130 may deny a grant of units to the credit control client (block 410). Referring to FIG. 3, credit control server 130 may return CCA 316 to credit control client 115, indicating that no service units have been granted.

If the units of the account have not been depleted (block 405—NO), then a determination may be made whether sufficient units are available to grant the request for units (block 415). Credit control unit 285 of credit control server 130 may access account records to determine if the end user's account has been depleted of service units. If there are sufficient units available to grant the request for units (block 415—YES), then the requested units may be granted to the requesting credit control client (block 420) and the exemplary process may continue at block 600 below, with the MSCC session transitioning to Open state 304 (FIG. 3). Referring to FIG. 3, credit control server 130 may determine that sufficient service units are available and may return CCA 320, granting (GSU) the requested service units to credit control client 115.

If sufficient units are not available (block 415—NO), then the available units may be granted to the requesting credit control client (block 430) and a F-U-I Redirect may be sent to the requesting credit control client (block 440). With the sending of the F-U-I Redirect, the MSCC session may transition to the Pre-Redirect state (Pre-Redirect state 306, FIG. 3). Referring to FIG. 3, credit control server 130 may determine that some, but not all, of the requested units are available, and may return CCA 318 with a grant of available service units (GSU) and with the F-U-I Redirect (including the Redirect address). The F-U-I Redirect address may subsequently be used by credit control client 115, or end user device 105, to "top-up" or refill, the end user's account.

A determination may be made whether a time out has occurred (block 450). If so (block 450—YES), then the exemplary process may return to block 400 and the MSCC session may return to an idle state (Idle state 302, FIG. 3). A validity time of the granted service units, specified at the time that credit control server 130 granted the service units, may time out (i.e., expire). Timer 287 may compare the validity time of the granted service units with its internal clock to determine if the time out has occurred. If a time out has not occurred (block 450—NO), then the credit control server may receive a report of the service units used by credit control client 115 (block 460). For example, credit control unit 285 of credit control server 130 may receive a CCR with a USU indication that reports the service units used by credit control client 115. Referring to FIG. 3, credit control server 130 may receive CCR 324 with the USU indication.

Referring to FIG. 5, a validity time of the redirect may be sent to the credit control client (block 500). For example, credit control unit 285 may send a CCA to credit control client 115 to inform credit control client 115 of the duration of the redirect. Referring to FIG. 3, credit control server 130 sends CCA 326 to credit control client 115 with the Redirect validity time (V-T). Upon sending the validity time of the redirect to credit control client 115, the MSCC session may transition to the Redirect state (Redirect state 308, FIG. 3).

A determination may be made whether the Redirect validity time has timed out (block 510). If so (block 510—YES), then the exemplary process may continue at block 400 with the MSCC session transitioning from redirect state 308 to idle state 302 (see "time out 328," FIG. 3). If the Redirect validity time has not timed out (block 510—NO), a request for units may be received from the credit control client (block 520) that requests a specific number of service units. Referring to FIG. 3, credit control unit 285 of credit control server 130 may receive CCR 330, 334 or 338, that requests a specific number of service units, from credit control client 115.

A determination may be made whether all of the requested units are available in the end user's account (block 530). Credit control unit 285 of credit control server 130 may access account records to identify if the end user's 105 account has any remaining service units credited to it. If all of the requested units are available (block 530—YES), then the requested units may be granted to the credit control client (block 540), and the exemplary process may continue at block 600 with the MSCC session transitioning from Redirect state 308 to Open state 304. Credit control unit 285 of credit control server 130 may send a CCA to grant the requested service units. For example, referring to FIG. 3, credit control server 130 may send CCA 336 to credit control client 115 to grant the requested service units. If all of the requested units are not available in the end user's account (block 530—NO), then a determination may be made whether some of the requested units are available (block 550). Credit control unit 285 of credit control server 130 may access account records to identify if some, but not all, of the requested service units are available. If some of the requested service units are not available (block 550—NO), then the grant of units to the credit control client may be denied (block 560), and the exemplary process may continue at block 400 with the MSCC session transitioning from Redirect state 308 to Idle state 302. Credit control unit 285 of credit control server 130 may return a CCA to credit control client 115 informing credit control client 115 of the denial of the grant of additional service units. Referring to FIG. 3, credit control server 130 may send CCA 332 to credit control client 115 with a result code (RC) indicating that no service units are available.

If some (but not all) of the requested units are available in the user's account (block 550—YES), then the available units may be granted to the credit control client (block 570) and a F-U-I Redirect may be sent to the credit control client (block 580). The exemplary process may continue at block 450 with the MSCC session transitioning from Redirect state 308 to Pre-Redirect state 306. Referring to FIG. 3, credit control unit 285 of credit control server 130 may send CCA 340, that includes a grant of service units (GSU) and a F-U-I Redirect, to credit control client 115

Referring to FIG. 6, subsequent to the granting of units to the credit control client at blocks 420 or 540, and transitioning of the MSCC session to Open state 304, a report of used service units may be received (block 600). Referring to FIG. 3, credit control unit 285 may receive CCR 339, 342 or 344 that includes a used service unit indicator (USU) that specifies service units used by credit control client 115. It may be determined whether a request for units has been received (block 610). If not (block 610—NO), then the exemplary process may continue at block 400, with the MSCC session transitioning from Open state 304 to Idle state 302. If a validity time associated with previously granted service units times out (352, FIG. 3), without the receipt of a request for additional units, then the MSCC session may transition from Open state 304 to Idle state 302.

If a request for units has been received (block 610—YES), then a determination may be made whether all of the requested units are available (block 620). Referring to FIG. 3, credit control server 130 may receive CCR 339, 342, or 341. Credit control unit 285 of credit control server 130 may access account records to determine whether all of the requested units are available.

If all of the requested service units are available (block 620—YES), then the requested units may be granted to the credit control client (block 630), and the exemplary process may return to block 600. Referring to FIG. 3, credit control unit 285 of credit control server 130 may send CCA 346 that includes a GSU that grants all of the requested service units. If all of the requested are not available (block 620—NO), then a determination may be made whether some of the requested units are available (block 640). If not (block 640—NO), then a grant of the requested units may be denied (block 650). Referring to FIG. 3, credit control unit 285 of credit control server 130 may return CCA 350 that includes a result code (RC) that indicates that no units are available from the user's account. The exemplary process may return to block 400 (FIG. 4), and the MSCC session may transition from Open state 304 to Idle state 302.

If some of the requested units are available (block 640—YES), then the available units may be granted to the credit control client (block 660) and an F-U-I Redirect may be sent to the credit control client (block 670). Referring to FIG. 3, credit control unit 285 of credit control server 130 may send CCA 348 that includes a GSU that grants a portion of the requested service units and an F-U-I Redirect. The exemplary process may then return to block 450 (FIG. 4) with the MSCC session transitioning from Open state 304 to Pre-Redirect state 306.

Figure 7:
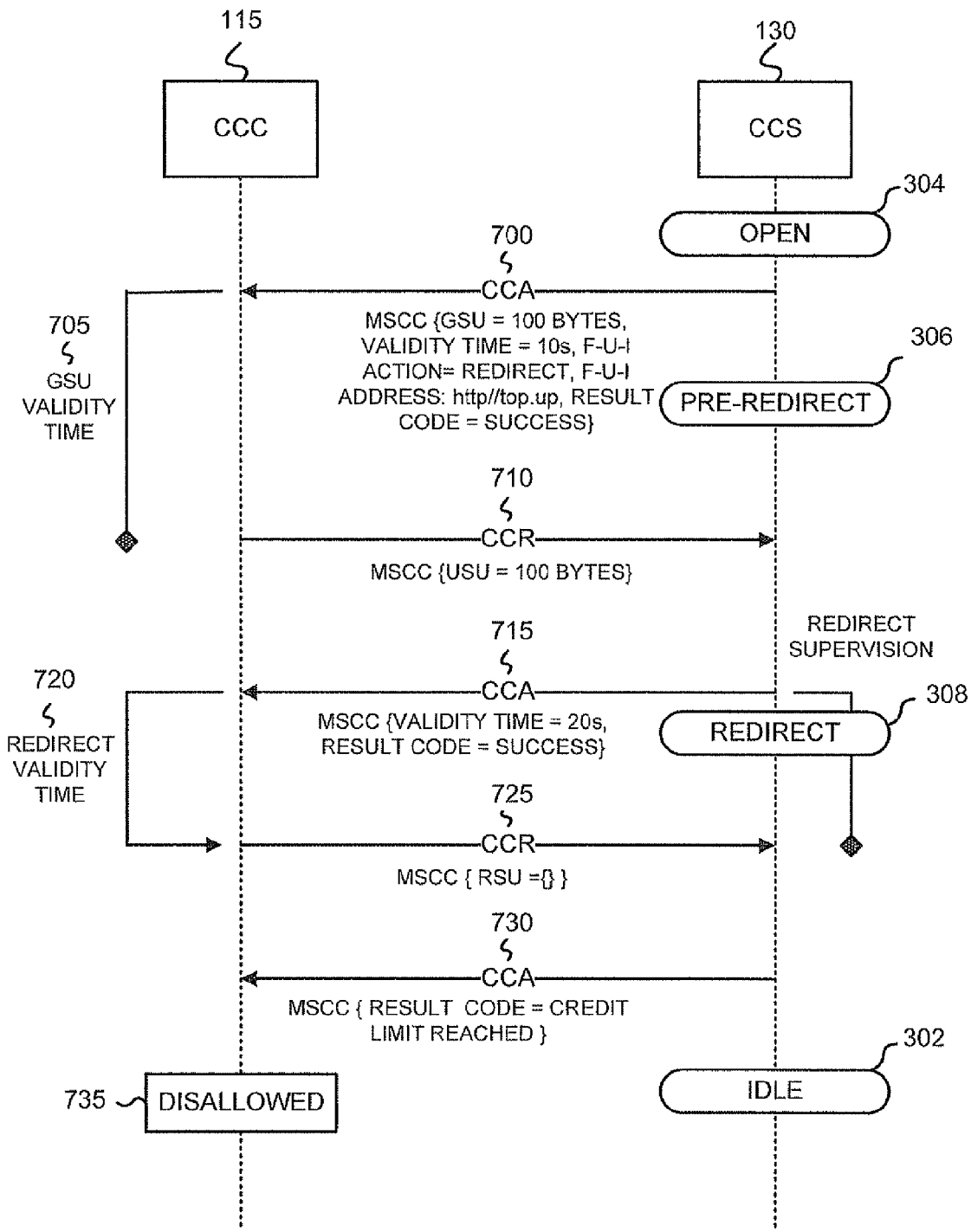
FIG. 7 is a messaging diagram that depicts Final-Unit-Indication with Redirect in a situation where the user chooses to not "top up" their account resulting in session termination.

FIG. 7 is a messaging diagram that depicts F-U-I with Redirect during a MSCC session in a situation where the end user chooses to not "top up" their account, thus, resulting in session termination. As shown in FIG. 7, the MSCC session may initially be in Open state 304 and credit control server (CCS) 130 may send a CCA 700 to credit control client (CCC) 115. CCA 700 may include a grant of 100 bytes of service units, a grant (GSU) validity time of 10 seconds, an F-U-I Redirect indication, and a Redirect address (e.g., http//top.up). The end user may choose to not "top up" their account in response to receiving the F-U-I Redirect indication. Upon sending of CCA 700, the MSCC session may transition to a Pre-Redirect state 306. When the granted service units have been consumed, CCC 115 may send a CCR 710 to CCS 130 indicating the number of used units (e.g., USU=100 bytes). Upon receipt of CCR 710 with the indication of the number of used units, CCS 130 may send a CCA 715, to CCC 115, that includes a redirect validity time (e.g., 20 s). Upon the sending of CCA 715, the MSCC session may transition from Pre-redirect state 306 to Redirect state 308. When the redirect validity time 720 expires (or if CCC 115 detects traffic and attempts another request for service units), CCC 115 may send a CCR 725 with a request for units (RSU). In response to CCR 725, CCS 130 may send a CCA 730 that may include a result code that indicates the end user's account has reached its credit limit (e.g., RC=credit limit reached). CCA 730 may also indicate that any further MSCC data traffic is disallowed 735 to CCC 115 since the end user did replenish their account. The MSCC session may transition from Redirect state 308 to Idle state 302.

Figure 8:
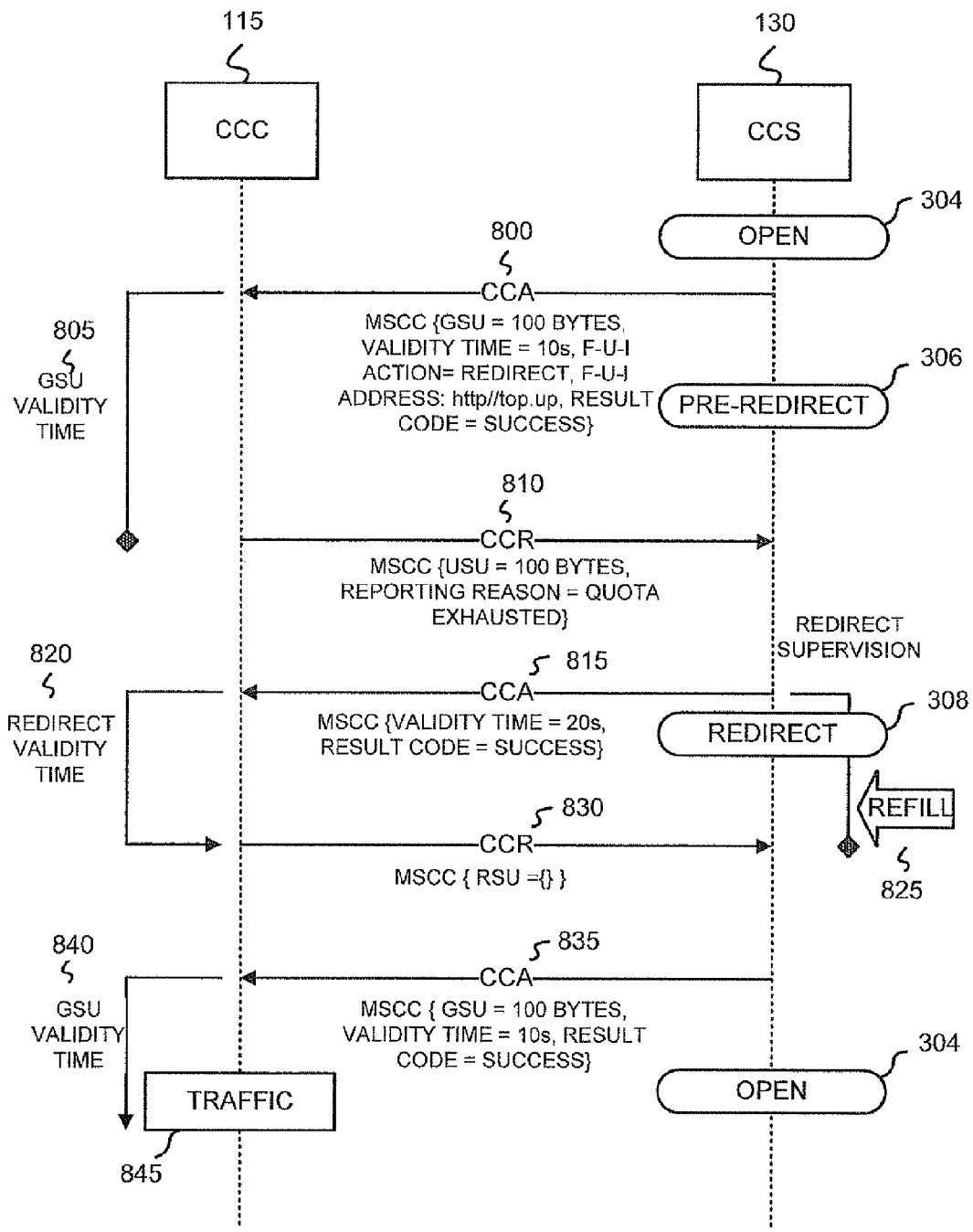
FIG. 8 is a messaging diagram that depicts F-U-I with Redirect in a situation where the user chooses to "top up" their account resulting in session continuance.

FIG. 8 is a messaging diagram that depicts F-U-I with Redirect in a situation where the end user chooses to "top up" their account resulting in session continuance. As shown in FIG. 8, the MSCC session may initially be in Open state 304 and CCS 130 may send a CCA 800 to CCC 115. CCA 800 may include a grant of 100 bytes of service units, a grant (GSU) validity time of 10 seconds an F-U-I Redirect indication, and a Redirect address (e.g., http//top.up). Upon sending of CCA 800, the MSCC session may transition to Pre-Redirect state 306. When the granted service units are consumed, CCC 115 may send a CCR 810 to CCS 130 indicating the number of used units (e.g., USU=100 bytes). Upon receipt of CCR 810 with the indication of the number of used units, CCS 130 may send a CCA 815 to CCC 115 that includes a redirect validity time (e.g., 20 seconds). Upon the sending of CCA 815, the MSCC session may transition from Pre-redirect state 306 to Redirect state 308. Prior to the expiration of the Redirect validity time, the end user associated with CCC 115 may use the previously received Redirect address to refill 825 the end user's account. When the Redirect validity time 820 expires (or if CCC 115 detects traffic and attempts another request for service units), CCC 115 may send a CCR 830 with a request for units (RSU).

Upon receipt of CCR 830, CCS 130 may send a CCA 835 that grants new service units (e.g., GSU=100 bytes) and which further includes a validity time (e.g., GSU validity time=10 seconds). Prior to expiration of GSU validity time 840, CCC 115 may send/receive traffic 845 corresponding to the granted number of units, thus, continuing the MSCC session by entering Idle state 302.

Through use of the exemplary embodiments described herein, it may be possible to implement services that can keep state information during and after a redirect to re-fill an end user's account of service units. The exemplary embodiments described herein may have applicability to many different services. For example, the exemplary embodiments may be applied to provide a bonus after a refill redirection. By keeping the MSCC session state open, it is possible to store in the state information that the redirect is ongoing. For example, when an end user returns from the redirect, with their account replenished with service units, a refill has occurred and the end user can be granted bonus units for a service (e.g., granted a few minutes of bonus time).

As another example, by keeping the MSCC session state open, session wide accumulators may be kept active throughout the redirect. These session wide accumulators can be used in various ways, such as, for example, to implement "bonus based on accumulated usage" within a session. An example of this may include an IPTV broadcast service, which awards cross-bonuses, giving away a free Multimedia Messaging Service (MMS) for every five minutes of a particular program. If the end user's account is depleted every four minutes and the end user refills, the end user will not get their bonus unless the session accumulator is preserved throughout the refill.

As yet another example, if a service is set-up to have Quantity Price Breaks, the accumulated usage may persist during a refill by keeping the MSCC state open during the refill. A specific example of this may include a chat service that costs $1 for the first minute, $0.5 for the second minute, and $0.1 for each subsequent minute. By keeping the accumulated usage in the state during refill, the Quantity Price Breaks don't have to restart just because of the refill.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 4-6, the order of the blocks may be modified in other implementations consistent with the principles of the invention. Further, non-dependent blocks may be performed in parallel. Exemplary embodiments have been described herein with respect to credit control server 130 "pushing" grants of requested service units out to clients 115. However, grants of requested service units may also use a "poll" approach, where an end user may replenish their account of service units, may attempt to re-attach to the service, and at re-attach, a poll may occur that indicates whether the requested service units have been granted.

Aspects of the invention may also be implemented in methods and/or computer program products. Accordingly, the invention may be embodied in hardware and/or in hardware/software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behavior of the aspects were described without reference to the specific software code—it being understood that one would be able to design software and control hardware to implement the aspects based on the description herein.

Furthermore, certain portions of the invention may be implemented as "logic" that performs one or more functions. This logic may include hardware, such as an application specific integrated circuit or field programmable gate array or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented in a Credit Control Server (CCS), the method comprising the steps of:
   receiving, at the CCS from a Credit Control Client (CCC), a message associated with a Multiple Services Credit Control (MSCC) session, wherein the message includes a request for service units associated with a service account;
   determining, at the CCS, that insufficient service units are available in the service account;
   notifying the CCC that service units need to be added to the service account by sending as part of an MSCC message a Final Unit Indication (F-U-I) redirect message to the CCC; and
   maintaining, at the CCS, MSCC session related parameters while the CCC adds service units to the service account.

2. The method of claim 1, further comprising:
   determining, at the CCS, that the CCC has added sufficient units to the service account; and
   granting, to the CCC, the requested service units.

3. The method of claim 1, wherein notifying the CCC that credit units need to be added to the service account comprises:
   providing a network address to the CCC at which the CCC can add the service units to the service account.

4. The method of claim 3, wherein the network address comprises a Uniform Resource Locator (URL) at which the CCC can add service units to the service account.

5. The method of claim 1, further comprising:
   receiving, at the CCS, a report of service units previously used by the CCC; and
   sending, from the CCS to the CCC, a time period during which the CCC is required to request service units before a time out occurs.

6. The method of claim 5, further comprising:
   determining whether the time period has expired prior to receiving a request for service units; and
   placing the MSCC session in an idle state if the time period has expired.

7. A Credit Control Server (CCS), comprising:
   an interface configured to receive a message, from a Credit Control Client (CCC) associated with a Multiple Services Credit Control (MSCC) session, wherein the message requests a grant of service units associated with a service account; and
   a processing unit configured to: determine, based on the request, that insufficient service units are available in the service account;
   notify the CCC that service units need to be added to the service account by sending as part of an MSCC message a Final Unit Indication (F-U-I) redirect message to the CCC; and
   maintain, in a memory, MSCC session related parameters during a period of time during which the CCC adds service units to the service account.

8. The credit control server of claim 7, wherein the processing unit is further configured to:
   determine that the CCC has added sufficient units to the service account; and
   grant, to the CCC, the requested service units.

9. The credit control server of claim 7, wherein, when notifying the CCC that service units need to be added to the service account, the processing unit is further configured to:
   provide a network address to the CCC at which the CCC can acid the service units to the service account.

10. The credit control server of claim 9, wherein the network address comprises a Uniform Resource Locator (URL) at which the CCC can add service units to the service account.

11. The credit control server of claim 7, wherein the processing unit is further configured to:
   receive a report of service units previously used by the CCC; and
   send to the CCC a time period during which the CCC is required to request service units before a time out occurs.

12. The credit control server of claim 11, wherein the processing unit is further configured to:
   determine whether the time period has expired prior to receiving a request for service units; and
   place the MSCC session in an idle state if the time period has expired.

13. A computer-readable medium containing instructions executable by at least one processor, the computer-readable medium comprising;
   one or more instructions for receiving, from a client, a message associated with a Multiple Services Credit Control (MSCC) session, wherein the message includes a request for service units associated with a service account;
   one or more instructions for notifying the client, based on receipt of the request for service units, when insufficient service units are available in the service account, wherein the notification includes as pan of an MSCC message a Final Unit Indication (F-U-I) and a network address at which the client can add service units to the service account; and
   one or more instructions for continuing the MSCC session, without losing session parameters and state information associated with the MSCC session, once the client adds service units to the service account.

14. The computer-readable medium of claim 13, wherein the network address of the notification comprises a Uniform Resource Locator (URL) at which the client can add the service units to the service account.

15. The computer-readable medium of claim 14, further comprising:
   one or more instructions for determining that the client has added sufficient units to the service account; and
   one or more instructions for granting the requested service units to the client.

* * * * *